Patented June 1, 1943

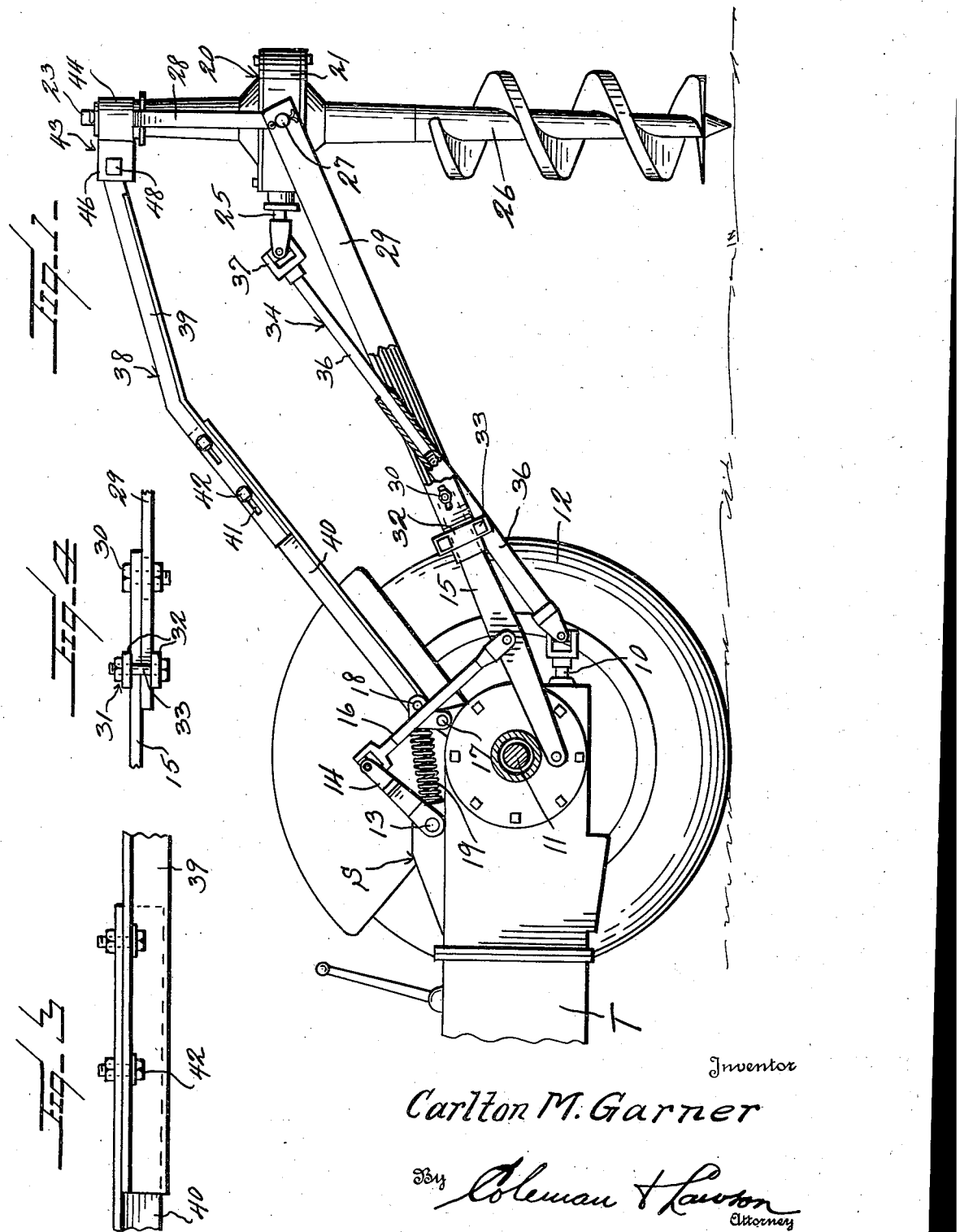

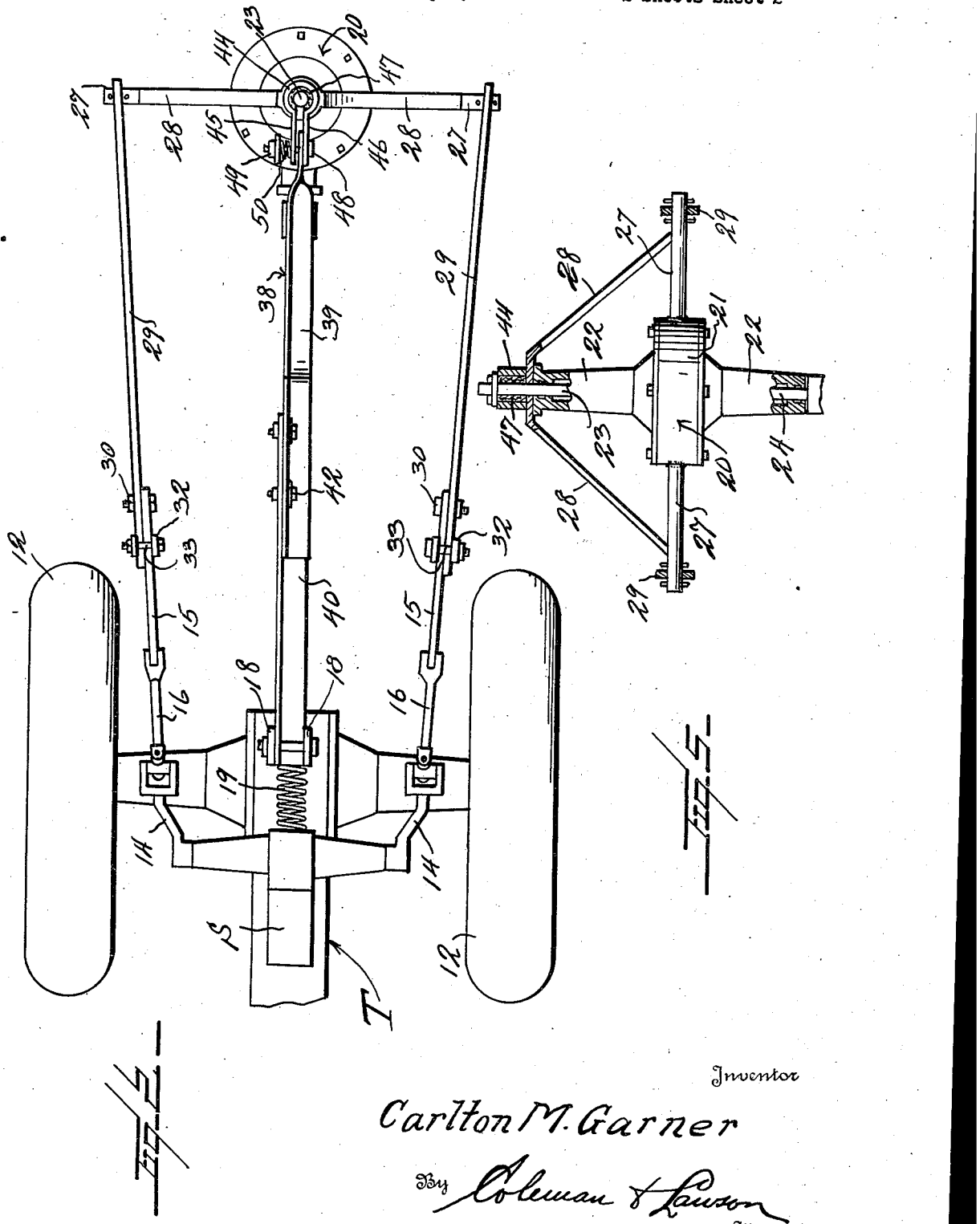

2,320,775

UNITED STATES PATENT OFFICE 2,320,775

TRACTOR OPERATED HOLE DIGGER

Carlton Morris Garner, New Madrid County, Mo.

Application July 7, 1942, Serial No. 450,047

6 Claims. (Cl. 255—19)

This invention relates to improvements in earth boring machines and pertains particularly to an improved power driven hole digger.

An object of the present invention is to provide an improved hole digging mechanism which is designed to be coupled with the power take-off of a farm tractor and which includes a supporting frame pivotally coupled to the tractor, for maintaining an auger substantially vertical or in a previously set position while being introduced into the earth.

Another object of the invention is to provide an earth hole digger designed to be driven from the power take-off of a farm tractor, in which a driving gearing is employed for transmitting rotary motion to the auger from the power take-off, which is designed to allow the stopping of rotation of the auger in the event that the same strikes a root or stone without checking the operation of the driving coupling between the gearing and the power take-off and without subjecting the gearing or other mechanism to strain or the possibility of damage.

Still another object of the invention is to provide in an earth boring mechanism including an auger, a differential power transmitting gearing adapted to be connected with the power take-off of a tractor, and pivotal supporting arms for connection with the tractor for facilitating the maintenance of the auger in a desired predetermined position while in operation, and for facilitating also the lifting of the auger above the ground surface when it is desired to shift the position of the borer.

The invention will be best understood from a consideration of the following detailed description taken in connection with the accompanying drawings, it being understood, however, that the invention is not to be considered as limited by the specific illustration or description but that such illustration and description constitute a preferred embodiment of the invention.

In the drawings:

Figure 1 is a view in side elevation of the borer embodying the present invention in position ready for the beginning of a boring operation, showing the connection of the bracing and guiding arms with the rear of a tractor, the near wheel of the tractor being removed, and a portion of the borer structure being broken away and in section.

Figure 2 is a view in top plan of the borer mechanism, showing the connections between the same and the tractor.

Figure 3 is a detailed view of the joint between the portions of the center bracing and clutch arm.

Figure 4 is a detailed view in top plan of the connection between a brace arm and a lifting link which is pivoted to the tractor.

Figure 5 is a view in front elevation of the differential showing the lateral arms and brace means therefor, portions being in section.

Referring now more particularly to the drawings, the reference character T designates the rear transmission enclosing portion of a tractor, which may be representative of any tractor of suitable type having a rearwardly directed power take-off 10. The rear axle of the tractor is indicated at 11 and the rear wheels are indicated by the numeral 12.

In the "Ford" farm tractor there is incorporated an implement draft and lift system known as the "Ferguson System." This system is generally designated S and includes a fluid actuator operated shaft 13 supported for oscillation on an axis extending transversely of the machine and carrying at its ends a pair of levers, indicated by the numeral 14.

Pivotally mounted for oscillation upon an axis paralleling the rear axle of the tractor are two rearwardly directed tension links 15, and each of these links is operatively coupled by a lift link 16 with a lift lever 14.

Disposed upon the top of the casing T, midway between the tension links 15, is a bearing 17 supporting spaced pivoted rocker members 18, the oscillatory movement of which is controlled by a control spring 19.

The present invention comprises a differential unit, indicated generally by the numeral 20, which is of the same construction as a motor vehicle differential mechanism and, therefore, the details of its construction are not illustrated. The housing for this differential unit is designated 21 and has extending from opposite sides thereof the usual axle sleeves 22 through each of which extends an axle, one of which is indicated at 23, while the other is indicated by the numeral 24. Extending radially from the housing of the differential is a driven stub shaft 25 which connects with the beveled gear pinion, not shown, which lies within the housing 21 and forms a part of the differential gear assembly.

The axle 24 is connected with an auger 26 while the opposite axle 23 extends beyond the end of the enclosing sleeve 22 to be engaged by a gripping or clutching device hereafter described.

Secured to and extending radially from opposite sides of the housing 21, and extending perpendicular to the stub shaft 25 are two rigid arms 27. In operation the auger is disposed vertically as shown and the axle 23 extends upwardly with respect to the housing. From the upper end of the axle sleeve 22 there are extended downwardly and outwardly the brace arms 28 which connect at their lower ends with the radial arms 27.

Each of the arms 27 has connected to the outer end thereof an end of a beam 29. The other end of each beam 29 is disposed against the rear end of a tension link 15 to which it is attached by a securing bolt 30 and a shackle 31 which consists of the two opposed plates 32 between which the overlapping ends of the beam and tension links are positioned, and the coupling bolts 33 which join the plates 32 together. These beams 29 extend forwardly from the differential housing in divergent relation for connection with the two tension links 15 which are raised and lowered by the hydraulic lifting system S.

The numeral 34 generally designates a two-part telescoping power drive shaft or power delivering shaft. The two parts of this shaft 34 are indicated by the numerals 35 and 36, one part being tubular, as shown, to receive an end of the other part and the power delivering shaft is connected at its two ends by universal couplings 37 with the tractor power take-off 10 and the differential shaft 25.

The beams 29 and tension links 15 with which they are connected, together form positioning and holding struts which swing vertically to maintain the auger substantially in upright position, the two ends of each of the struts turning on parallel horizontal axes.

Oscillation of the auger unit about the axis of the arms 27 is prevented by a third and centrally positioned strut which is generally indicated by the reference character 38. This strut 38 is in two sections which are indicated by the characters 39 and 40, and ends of these sections are in overlapping relation and provided with the aligning bolt slots 41 through which are passed securing bolts 42. By means of this joint arrangement between the two portions of the strut 38 the strut may be lengthened or shortened to direct the auger as desired. This adjustment is of particular advantage where a hole is to be drilled into the earth vertically where the surface of the earth slopes.

One end of the strut 38 is pivotally secured between the rocker members 18. The secured portion of the strut is here designated as the portion 40. The other portion 38 of the strut 38 is bent transversely intermediate its ends so that a part of the rear end of the strut 38 is disposed more nearly the horizontal when the auger is in starting position for drilling, than the inner end portion of the strut.

The rear end of the strut 38 is connected with a gripping or clutch unit indicated generally by the numeral 43. This unit comprises a split band or ring 44 having the spaced relatively long terminal ears 45 and 46 and a friction liner 47. The friction liner encircles the upper end of the axle 23 and the ears 45 and 46 have positioned therebetween the rear end of the portion 39 of the bracing or holding strut 38. A bolt 48 passes through the two ears and the rear end of the strut 38 and upon one end carries the nut 49 between which and the adjacent ear, the ear 45, is placed an expansion spring 50 which, bearing against the ear 45, tends to force the two ears together and thus tighten or contract the friction band 47 around the axle 23.

It will be understood that the borer as shown in Figure 1 is maintained in position by the hydraulic control S and may be raised beyond this position, if desired, when the device is to be transported to another location. As the point of the auger is lowered into contact with the ground by the control system rotary power will be delivered to the shaft 24 from the power take-off, through the medium of the delivery shaft 34 and the stub shaft 25. The upper axle 23 will be held against rotation so that all of the power will be delivered to the axle 24 to which the auger is attached, and at a greater speed than would be the case if the two axles of the differential mechanism were permitted to turn in the customary manner.

As the auger penetrates the earth the lower divergent struts, comprising the beams 29 and links 15, and the upper bracing strut will maintain the auger substantially vertical. If the point or blade of the auger should strike a rock or root which would tend to stop its rotation, then the power would be delivered to the upwardly extending axle 23 which would slip in the clutch 43. Consequently, the rotation of the power delivery shaft would be permitted to continue, even though the auger had stopped rotating, without damaging the machine.

While a particular type of tractor has been referred to, and also the mechanism has been illustrated and described as being raised and lowered by a mechanical supporting or lifting means, such as the system S, it is to be understood that the invention is not to be confined to use with such a lifting system, as it will be readily understood that the struts connecting the auger with the tractor may be raised and lowered by hand or manual power or in any other suitable manner.

I claim:

1. An earth boring mechanism comprising a differential gearing unit, a pair of axles operatively coupled together by said differential unit, means maintaining said axles vertically, an earth auger connected with the lower one of the axles, means for transmitting driving power to the differential unit, and means yieldingly frictionally holding the upper one of said axles against turning during the driving of the auger into the earth and yielding for the rotation of the upper axle in the event of stoppage of the turning of the auger.

2. A mechanism as set forth in claim 1, in which the said means for maintaining the axles in vertical position constitutes bracing struts pivotally secured at the ends remote from the axles for oscillation on substantially horizontal axes for facilitating up and down movement of the auger while maintaining its substantially vertical position.

3. An earth borning mechanism as set forth in claim 1, in which the stated means for maintaining the axles vertically comprises elongated struts pivotally secured at the ends thereof remote from the axles for oscillation upon substantially horizontal axes, the said frictional axle holding means being carried by one of said struts and constituting the coupling between the said one strut and the adjacent axle.

4. An earth boring mechanism for attachment to a tractor, comprising a differential gearing unit, a pair of axles operatively coupled together by said gearing unit, a pair of arms rigidly supported from the gearing unit and extending in aligned relation diametrically therefrom in perpendicular relation with said axles, a pair of struts each pivotally attached to an arm, means for pivotally attaching said struts to the rear of a tractor unit for oscillation on a common horizontal axis, means for transmitting driving power from the tractor to the differential gearing, an auger operatively coupled with the lower one of the vertical axles, a strut disposed above the first-mentioned struts and adapted to be pivotally attached at one end to the tractor above the pivotal axis for the first struts and for oscillation on a horizontal axis paralleling the stated axis for the first struts, and a friction clutch carried upon the other end of the said strut and frictionally engaging the upper axle to hold the latter against turning during the rotary operation of the auger in the earth, said frictional clutch being designed to yield to turning force applied to the upper axle upon the application of a predetermined resistance to the turning of the auger.

5. An earth boring mechanism as set forth in claim 4, including mechanism for effecting the raising and lowering of the struts upon the pivotal connections between the struts and the tractor.

6. An earth boring mechanism of the character set forth in claim 4, in which that strut connected with the clutch consists of adjustably connected sections by which the lengthening or shortening of the strut is facilitated.

CARLTON MORRIS GARNER.